US007070503B2

(12) United States Patent
Rudolph

(10) Patent No.: US 7,070,503 B2
(45) Date of Patent: Jul. 4, 2006

(54) SLOT MACHINE METHOD WITH SYMBOL REPLACEMENT

(75) Inventor: Brian A. Rudolph, Henderson, NV (US)

(73) Assignee: Action Gaming, Inc., Las Vegas, NV (US)

( * ) Notice: Subject to any disclaimer, the term of this patent is extended or adjusted under 35 U.S.C. 154(b) by 602 days.

(21) Appl. No.: 10/327,164

(22) Filed: Dec. 20, 2002

(65) Prior Publication Data

US 2004/0121836 A1 Jun. 24, 2004

(51) Int. Cl.
*A63F 13/00* (2006.01)

(52) U.S. Cl. ............................ 463/20; 463/22; 463/13

(58) Field of Classification Search .................. 463/20, 463/16, 13, 22; 273/143 R
See application file for complete search history.

(56) References Cited

U.S. PATENT DOCUMENTS 5,704,835 A 1/1998 Dietz .......................... 463/20
5,823,873 A 10/1998 Moody ........................ 463/13
6,089,977 A 7/2000 Bennett ....................... 463/20
6,251,013 B1 6/2001 Bennett ....................... 463/13
6,375,570 B1 4/2002 Poole .......................... 463/31
6,561,900 B1 * 5/2003 Baerlocher et al. ........... 463/20
6,910,962 B1 * 6/2005 Marks et al. ................. 463/16
2003/0087687 A1 * 5/2003 Locke et al. .................. 463/20
2003/0224850 A1 * 12/2003 Anderson et al. ............. 463/20
2004/0033829 A1 * 2/2004 Pacey et al. .................. 463/20
2004/0198489 A1 * 10/2004 Kaminkow et al. ........... 463/20
2005/0054420 A1 * 3/2005 Cregan et al. ................ 463/20

* cited by examiner

*Primary Examiner*—Corbett B. Coburn
*Assistant Examiner*—Sunit Pandya
(74) *Attorney, Agent, or Firm*—John Edward Roethel

(57) ABSTRACT

A slot machine is provided with a plurality of slot symbols which results in a display matrix having a plurality of reel stop locations. A player makes a wager for each pay line on the slot machine that the player wishes to be active. Prior to the reels being spun, the player selects two of the reel stop locations as the player's lucky reel stop locations. The slot reels are spun and the player receives an award for any winning symbol combinations that appear on active pay lines. Then the reel stop locations selected by the player are switched and the pay lines are reanalyzed to determine if winning combinations have been achieved as a result of the switching of the two reel stop locations. The player receives an award for any winning symbol combinations that appear on active pay lines.

12 Claims, 12 Drawing Sheets

SLOT MACHINE METHOD WITH SYMBOL REPLACEMENT

BACKGROUND OF THE INVENTION

This invention relates primarily to electronic video gaming devices, and more particularly to electronic video slot machines that display multiple pay lines. While the present invention has many variations, the basic principle common to all of the variations is that the player selects two symbol locations from among all of the symbol locations on the slot reels. After the slot reels have been spun and the player is paid for any winning slot symbol combinations on active pay lines, the two symbol locations chosen by the player are switched between each other. The player is then paid for any more winning symbol combinations that the player has achieved after the switch.

There have been many types of slot machines that adjust the location at the slot reels after the spin of the reels has stopped. For example, there are slot machines that move a reel up or down one vertical reel stop location at the end of the initial reel spin. This gives the player the opportunity to receive a winning reel combination when one initially would not have existed.

Other proposed slot machines allow the player to respin the reels in attempt to improve the reel symbol combinations into a winning combination. U.S. Pat. No. 5,704,835 (Dietz) discloses a slot machine in which, after a losing spin of the reels, the player may select one or more slot symbols which are then respun in order to give the player the opportunity to achieve a winning symbol combination.

U.S. Pat. No. 6,089,977 (Bennett) discloses a slot machine in which a single slot symbol becomes a wild card and is moved through the matrix of reel stop locations in order to effect additional winning symbol combinations. The player is only awarded this feature when a certain predetermined arrangement of symbol combinations (a triggering event) appears during the initial spin of the reels. Similarly, in U.S. Pat. No. 6,251,013 (Bennett) upon the occurrence of a triggering event, one or more of the slot symbols are treated as special symbols such as wild card symbols or scatter pay symbols.

None of these slot machines allow the player to select his lucky reel stop locations prior to the spin occurring. It is an object of the present invention to provide a slot machine in which the player can earn additional payouts after the spin of the reels has been completed.

It is a feature of the present invention that the player selects two reel stop locations as his lucky reel stop locations. This selection is made prior to the spin of the reels. After the reels have been spun and the player receives any payouts to which he is entitled, the two reels stop locations selected by the player are switched. The game display is then reanalyzed to determine if any winning symbol combinations occur after the switch has taken place and additional awards are paid to the player for such winning symbol combinations.

It is an advantage of the present invention that the player is provided with a second opportunity to win awards on account of the symbol switching after the initial reel spin. This makes for a more entertaining slot machine experience and adds player interaction to the slot machine game since the player must select which symbols the player wishes to have switched.

U.S. Pat. No. 5,823,873 (Moody) (the disclosure of which is incorporated herein) discloses a multiple hand poker game in which three rows of cards are dealt to a player. The player makes a wager for each row of cards. One row of five cards are dealt all face up. The player selects none, one or more of the face up cards from the first row as cards to be held. The cards that are held are duplicated from the first row into all of the other rows. Replacement cards for the non-selected cards are dealt into the first row. Additional cards are also dealt to all of the other rows so that each row is a five card hand. The poker hand ranking of each five card hand by row is determined. The player is then paid for any winning poker hands based on a pay table and the amount of the player's wager.

It is a further object of the present invention to provide a multiple hand video poker machine in which the player can earn additional payouts after the initial play of the multiple poker hands has been completed.

It is a further feature of the present invention that the player selects card locations in different rows as his lucky card locations. This selection is made prior to the play of the multiple hands. After the draw and replacement steps of the multiple hand game have been accomplished and the player receives any payouts to which he is entitled, the two card locations selected by the player are switched. The game display is then reanalyzed to determine if any winning card combinations occur after the switch has taken place and additional awards are paid to the player for such winning card combinations.

It is a further advantage of the present invention that the player is provided with a second opportunity to win awards on account of the card switching after the initial play of the multiple hands.

Other objects, features and advantages of the present invention will become apparent from a consideration of the following detailed description.

SUMMARY OF THE INVENTION

A slot machine is provided with a plurality of slot symbols and multiple rows and multiple reels which results in a display matrix having a plurality of reel stop locations. A player makes a wager for each pay line on the slot machine that the player wishes to be active for that play of the slot machine. Prior to the reels being spun, the player selects two of the reel stop locations as the player's lucky reel stop locations.

The slot reels are spun and, when they come to a stop, the player receives an award for any winning symbol combinations that appear on active pay lines. Then the reel stop locations selected by the player are switched and the pay lines are reanalyzed to determine if winning combinations have been achieved as a result of the switching of the two reel stop locations. If so, the player receives an award for any winning symbol combinations that appear on active pay lines.

All awards are based on a pay table and the amount of the player's wager on an active pay line. Any suitable winning combinations can be used such as matching symbols, scatter pays and the like.

The method of the present invention can also be applied to multiple hand video poker games by allowing the player to select two card locations that are switched after the play of the initial video poker hands.

DETAILED DESCRIPTION OF THE PREFERRED EMBODIMENTS

The present invention includes a method of and apparatus for playing a casino game that can be programmed on an electronic video slot machine. The electronic video slot machine has a plurality of slot reels which are the representation of slot reels on a video display. At least one and preferably a plurality of pay lines are used.

The slot reel display is in a matrix form comprising a number of vertical columns and a number of horizontal rows. Any suitable number of columns and rows can be used; preferably five columns and three rows which result in a 5×3 matrix. Each location in the matrix is a reel stop location and thus fifteen reel stop locations are preferably displayed to the player.

After the player has made a wager to participate in the play of the game, the player selects his "lucky" reel stop locations. Displayed to the player are each of the reel stop locations, for example, the fifteen reel stop locations if the preferred 5×3 matrix is being used.

By manipulating the buttons on the gaming device or by using conventional touch screen technology, the player selects which of the reel stop locations are going to be the reel stop locations that are switched. In the preferred embodiment of the present invention, two reel stop locations are selected by the player.

Figure 1:
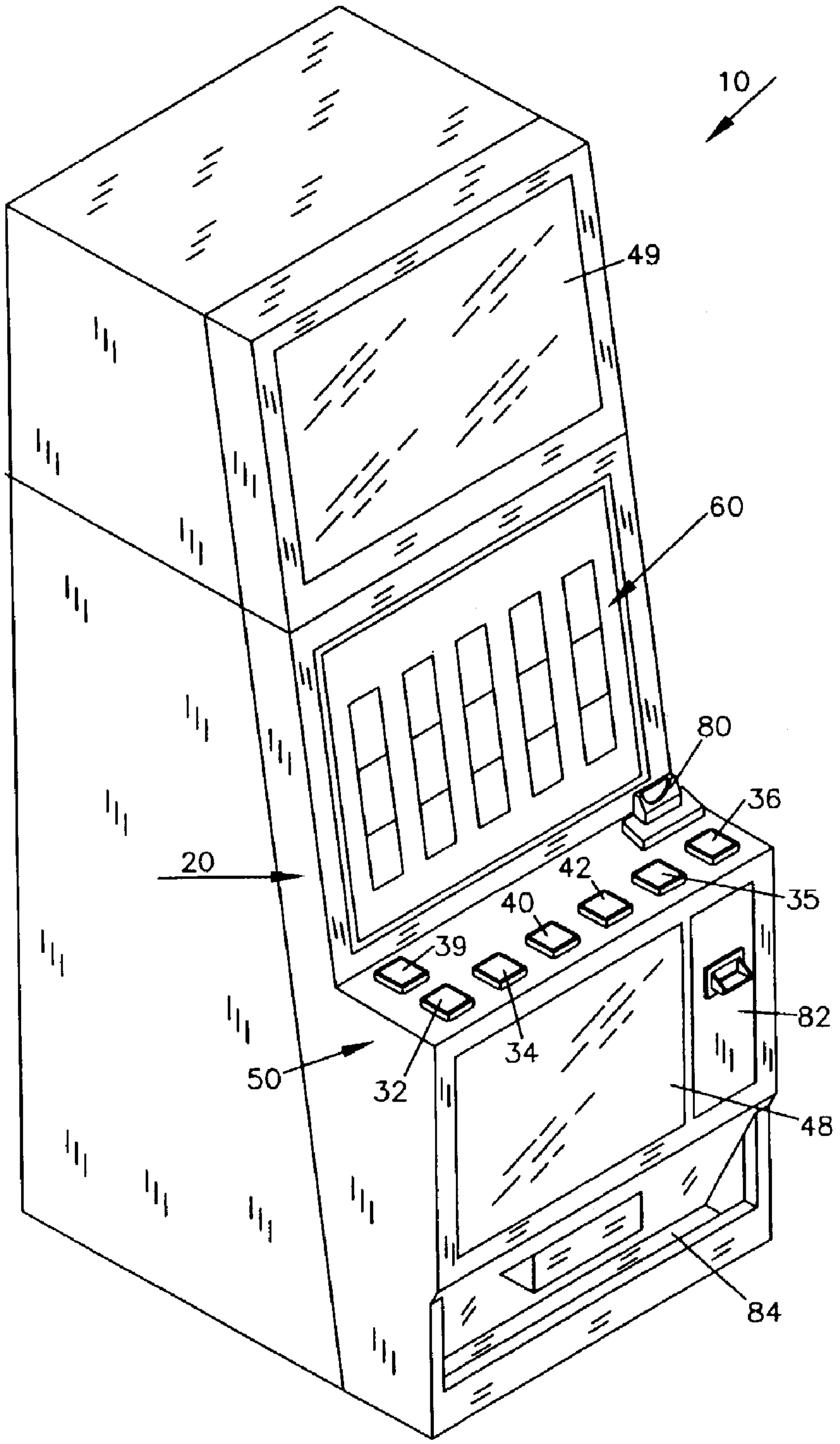
FIG. 1 shows a perspective view of a gaming machine of the present invention.
Figure 2:
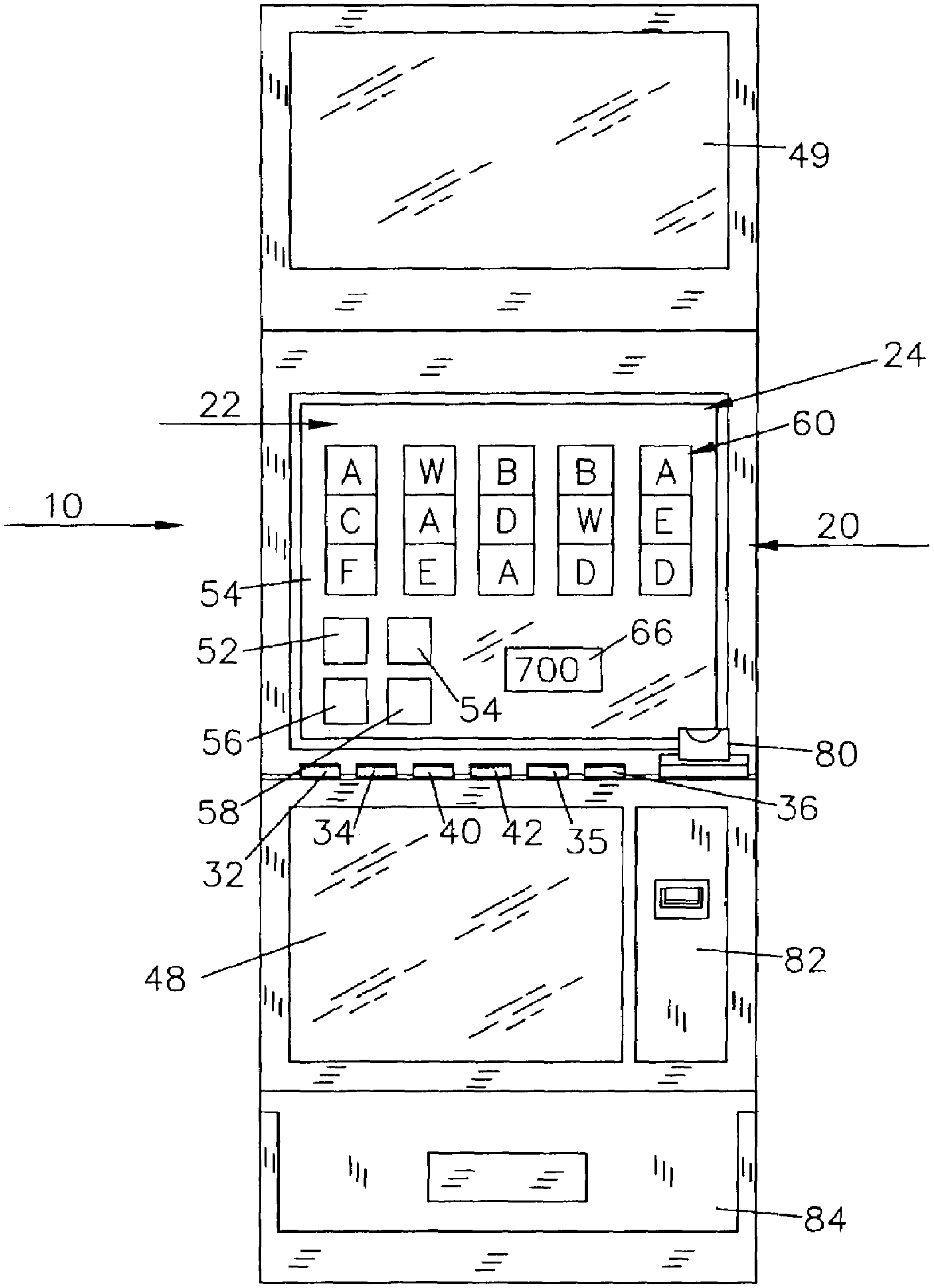
FIG. 2 shows a front view of the gaming machine of the present invention.

FIG. 1 and FIG. 2 show a representative gaming machine 10 that is configured to practice the present invention. The gaming machine 10 includes a video screen display 20 in any suitable location such as in the general center area of the gaming machine 10. Belly glass 48 and top glass 49 can be provided upon which can be printed or otherwise marked information about the game. The gaming machine 10 also includes a button panel 50 which provides the mounting area for a plurality of buttons used by the player to operate the gaming machine. The button panel 50 also can provide space for a coin head 80 into which the player deposits coins or gaming tokens to make a wager or to accrued credits on a credit meter. A bill acceptor 82 is also provided in any suitable location into which the player can insert paper currency or coupons which are also used to make wagers or to accrued credits on the credit meter. A coin tray 84 is also provided as is conventional into which coins are dispensed from a coin hopper (not shown) when a player wishes to cash out.

On the interior of the gaming machine 10 are the computer controls that operate the gaming machine as well as the other conventional hardware used in a gaming machine such as the coin hopper, the video monitor hardware, the wiring harness, the coin validator, the bill acceptor equipment and other suitable devices used to make the gaming machine 10 operational.

The layout of the gaming machine 10 shown in FIGS. 1 and 2 is only representative of one suitable layout and other layouts may be used as desired.

In one of the preferred embodiments of the present invention, each of the slot games would have a five slot reel display 60 using a five column by three row matrix. Alternatively, the games could utilize any number of columns and rows, for example, a three column by three row matrix and the number of columns would determine how many slot reels are displayed to the player.

In the preferred embodiment of the present invention, a set of buttons are mounted on the button panel 50 and are used by the player to control the functions of the slot game. As shown in FIG. 1, these buttons include Select Pay Lines 40, Bet Per Line 42, Max Bet 35, Spin Reels 34, Pay Table 34, Help 32 and Cash Out 39. Any or all of these control buttons may alternatively be displayed on the video display as touch screen activated locations. If necessary, any number of additional buttons may added to further facilitate control of the games.

In the preferred embodiment of the present invention, a set of display meters are shown on the video display screen 20 to display information about the play of each round of the slot machine as shown in FIG. 2. These display meters show the Number of Pay Lines 52, the Amount Bet Per Line 54, the Total Bet 56 and the Amount Paid 58. The Number of Pay Lines meter 52 is associated with the Select Pay Lines button 40 and displays the current number of Pay Lines Selected. The Amount Bet Per Line meter 54 is associated with the Bet Per Line button 42 and displays the number of credits wagered per pay line. The Total Bet meter 56 displays the cumulative value of the Number of Pay Lines 52 and the Amount Bet Per Line 54; and the Amount Paid meter 58 displays the number of credits won on the last spin. A Credit Meter display 66 shows the amount of the player's total credits that are available to use to play the gaming machine or which may be cashed out when the player decides to stop playing the gaming machine.

These buttons and meter displays are conventional and can be arranged in any suitable configuration on the button panel 50 and the video display 20.

In a preferred embodiment of the present invention, the player deposits coins, tokens or paper currency into the coin head slot 80 or a paper currency bill acceptor 82 to establish credits on the Credit Meter 66. The number of credits increases and decreases according to the player's wins or losses and may be supplemented, if necessary, by the player by additional deposits of coins, tokens or paper currency. As shown in FIG. 2, the player is starting with 700 credits on Credit Meter 66.

To commence the play of the game, the player makes a wager to activate the pay lines. As is conventional, the player makes a separate wager for each pay line that the player wishes to play. Any number of reels and any number of pay lines can be provided. In the preferred embodiment, there is used a 5×3 matrix using five reels and three rows of symbols. Also, in the preferred embodiment, a total of nine pay lines in any suitable configuration is used.

A common theme can be used for the symbols such as a theme using easily recognizable symbols of Australia such as a boomerang, a kangaroo, a platypus and the like. Any suitable theme and any suitable symbols made be used including the traditional fruit symbols that have previously been used in reel slot machines.

Figure 3:
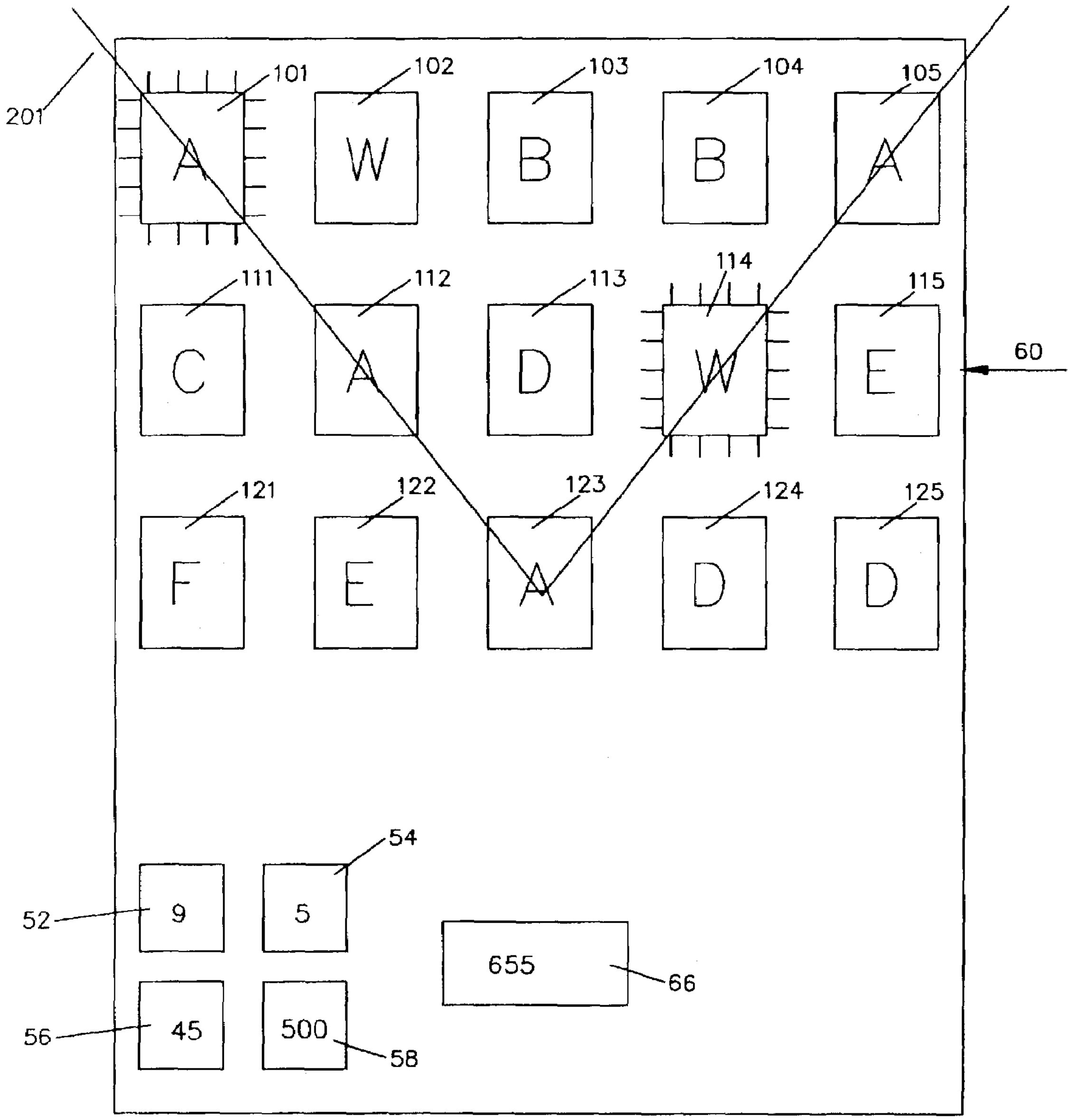
FIG. 3 shows the screen display portion of the gaming machine of the present invention with a first representative slot game outcome.

In the preferred embodiment of the present invention, the amount of the player's wager on each pay line would be the same. As shown in FIG. 3, the player has wagered by five credits on each of the nine pay lines. This is shown as nine pay lines in the Number of Pay Lines 52 with five credits in the Amount Bet Per Line 54 for a forty-five credit Total Bet 56. The Credit Meter 66 has been reduced to 655 credits to reflect the player's forty-five credit wager. Alternatively, the player could be allowed to make wagers of different amounts on each pay line.

After the player has selected the number of pay lines that the player wishes to play, the player selects which of the reel stop locations will be the reel stop locations that are switched during the play of the game. As shown in FIG. 3, the player has selected reel stop location 101 and reel stop location 114 as the reel stop locations that will be switched.

The player effects this selection by simply pressing the reel stop locations on the screen that the player wishes to select. This can be accomplished by using conventional touch screen technology. Alternatively, the selection can be made by having the player press buttons (not shown) that correspond to each of the reel stop locations. These buttons can be provided on the button panel 50 on the gaming machine 10.

The player then causes the gaming machine to spin the reels so that the outcome of the play of the game can be displayed. This can be done in any suitable manner such as having the player press the Spin Reels button 34 on the button panel 50 or, if touch screen technology is being used, by having the player press a "SPIN" panel location (not shown) on the screen display 20, or even by having the player pull a handle (not shown) mounted on the side of the gaming machine 10 to cause the reels to be spun as is conventional.

Any suitable pay table can be used and is displayed to the player on the video screen display 20 when the player presses the Pay Table button 34. The winning amounts and winning symbol combinations shown in the pay table are based on the distribution of symbols and the mathematical return desired to be provided on the gaming machine as is conventional and well known to those skilled in the art.

A typical pay table is shown in Table 1:

TABLE 1

| | | | | | |
|---|---|---|---|---|---|
| **F-F-F-F-F** | 2500 | **F-F-F-F** | 500 | **F-F-F** | 100 |
| **E-E-E-E-E** | 1500 | **E-E-E-E** | 300 | **E-E-E** | 60 |
| D-D-D-D-D | 750 | D-D-D-D | 150 | D-D-D | 30 |
| C-C-C-C-C | 500 | C-C-C-C | 100 | C-C-C | 20 |
| **B-B-B-B-B** | 250 | **B-B-B-B** | 50 | **B-B-B** | 10 |
| **A-A-A-A-A** | 100 | **A-A-A-A** | 20 | **A-A-A** | 4 |

Any W symbol is Wild and replaces any symbol. Each payout amount is based on a single credit wagered and would be increased by the number of credits wagered on a winning pay line.

As an example of play and with reference to FIG. 3, using the letters A-F and the letter W (Wild Symbol) to represent the symbols, the game displays an initial outcome of the following symbols:

| | | | | |
|---|---|---|---|---|
| **A** | W | B | B | **A** |
| C | **A** | D | **W** | E |
| F | E | **A** | D | D |

The winning symbol combination is shown in bold along pay line 201 in FIG. 3 and the player would receive an award of five hundred credits (five credits wagered×100) for a winning symbol combination of A-A-A-W-A. The Wild Symbol W acts as an A for the purposes of determining whether a winning combination exists. The Amount Paid meter 58 increases to reflect the win of five hundred credits.

Figure 4:
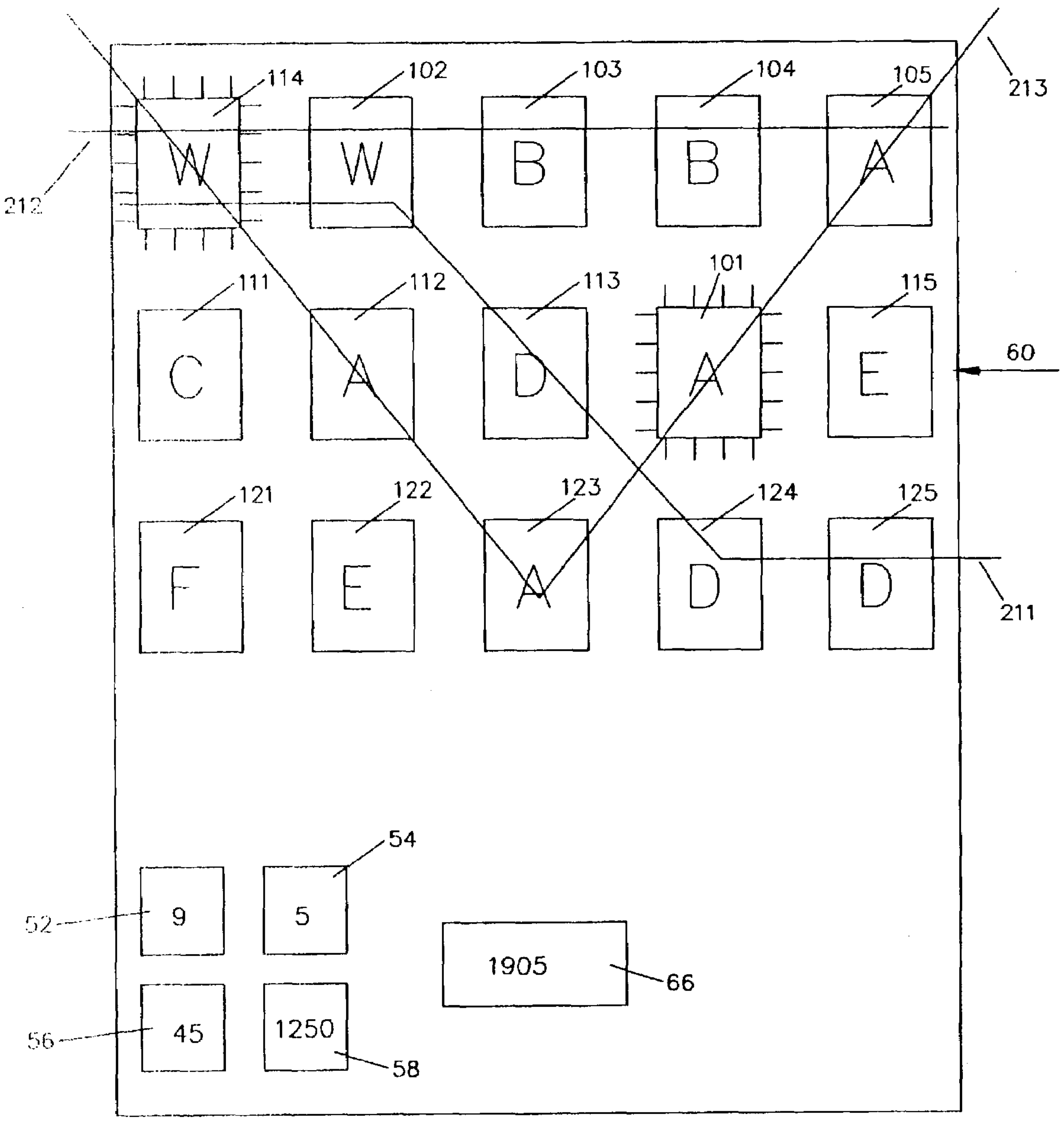
FIG. 4 shows the screen display portion of the gaming machine of the present invention with a second representative slot game outcome.

After the initial spin of the reels, the two reel stop locations that were pre-selected by the player are switched. As shown in FIG. 4, reel stop location 114 is switched with reel stop location 101. This provides a different arrangement of the slot reel symbols and results in three more winning symbol outcomes: W-W-D-D-D along pay line 211 worth 500 credits; W-W-B-B along pay line 212 worth 250 credits; and W-A-A-A-A along pay line 213 worth another 500 credits. The total payout of 1250 credits is shown in Amount Paid meter 58 and the Credit Meter 66 is incremented to show that the player now has a total of 1905 accrued credits.

Symbol C can also be a Bonus Symbol which is useful when achieved with other Bonus Symbols to effect a Bonus Round play. The Bonus Symbols can trigger a Bonus Round when the Bonus Symbols are achieved in a predetermined arrangement, such as a Scatter Pay arrangement as is conventional.

Figure 5:
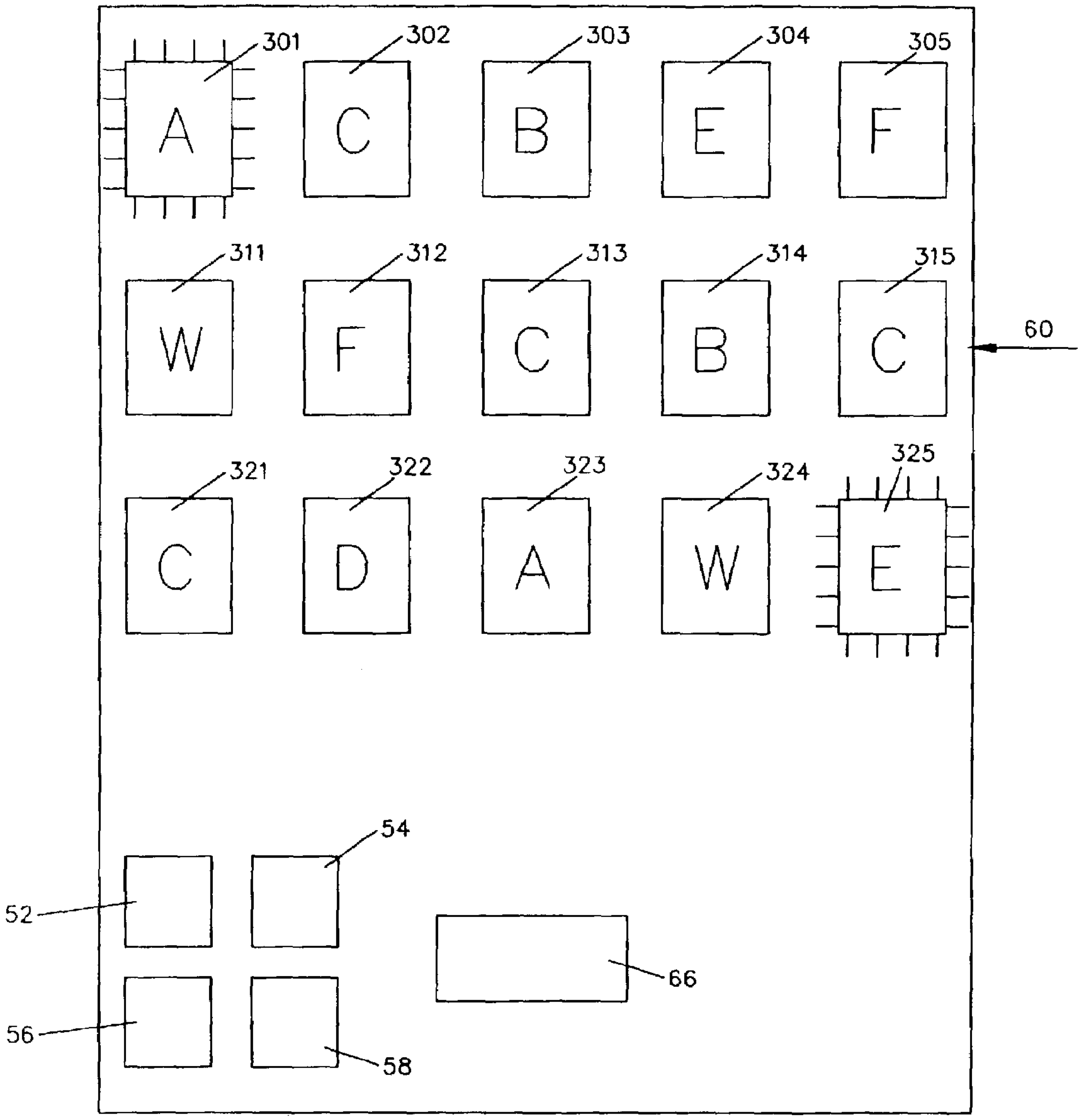
FIG. 5 shows the screen display portion of the gaming machine of the present invention with a third representative slot game outcome.

FIG. 5 shows an example of four Bonus Symbols shown in bold arranged as a Scatter Pay that triggers a Bonus Round.

| | | | | |
|---|---|---|---|---|
| A | **C** | B | E | F |
| W | F | **C** | B | **C** |
| **C** | D | A | W | E |

Figure 6:
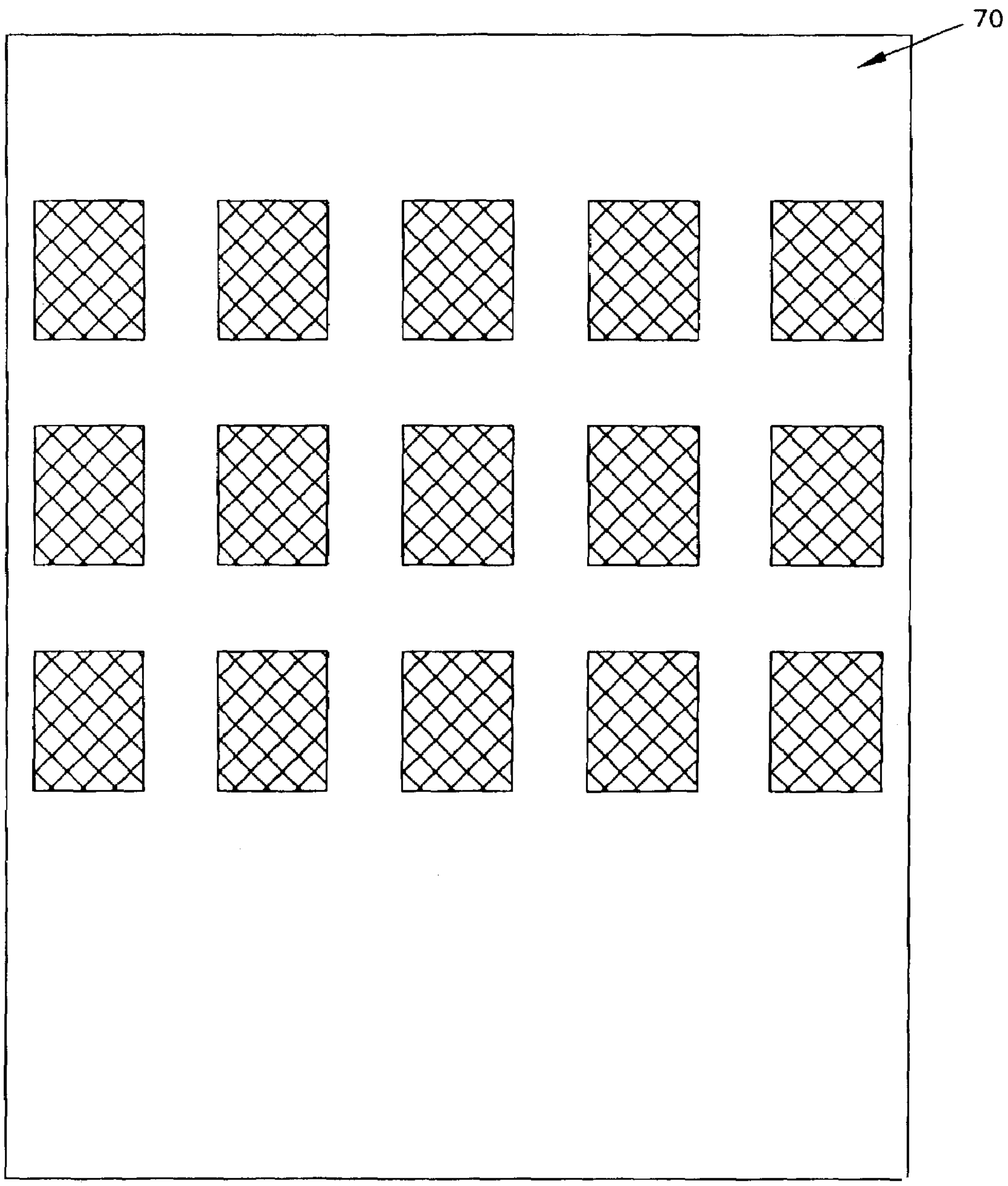
FIG. 6 shows the screen display portion of the gaming machine of the present invention with a representative game outcome showing the bonus round.

The Bonus Round can take any suitable format. In the preferred embodiment of the present invention, the Bonus Round first takes the player to a second screen display 70 shown in FIG. 6. This second screen display 70 shows a plurality of screen locations each having a symbol therein. The symbols can have any suitable look such as a kangaroo if an Australian theme is being used for the slot machine game.

Figure 7:
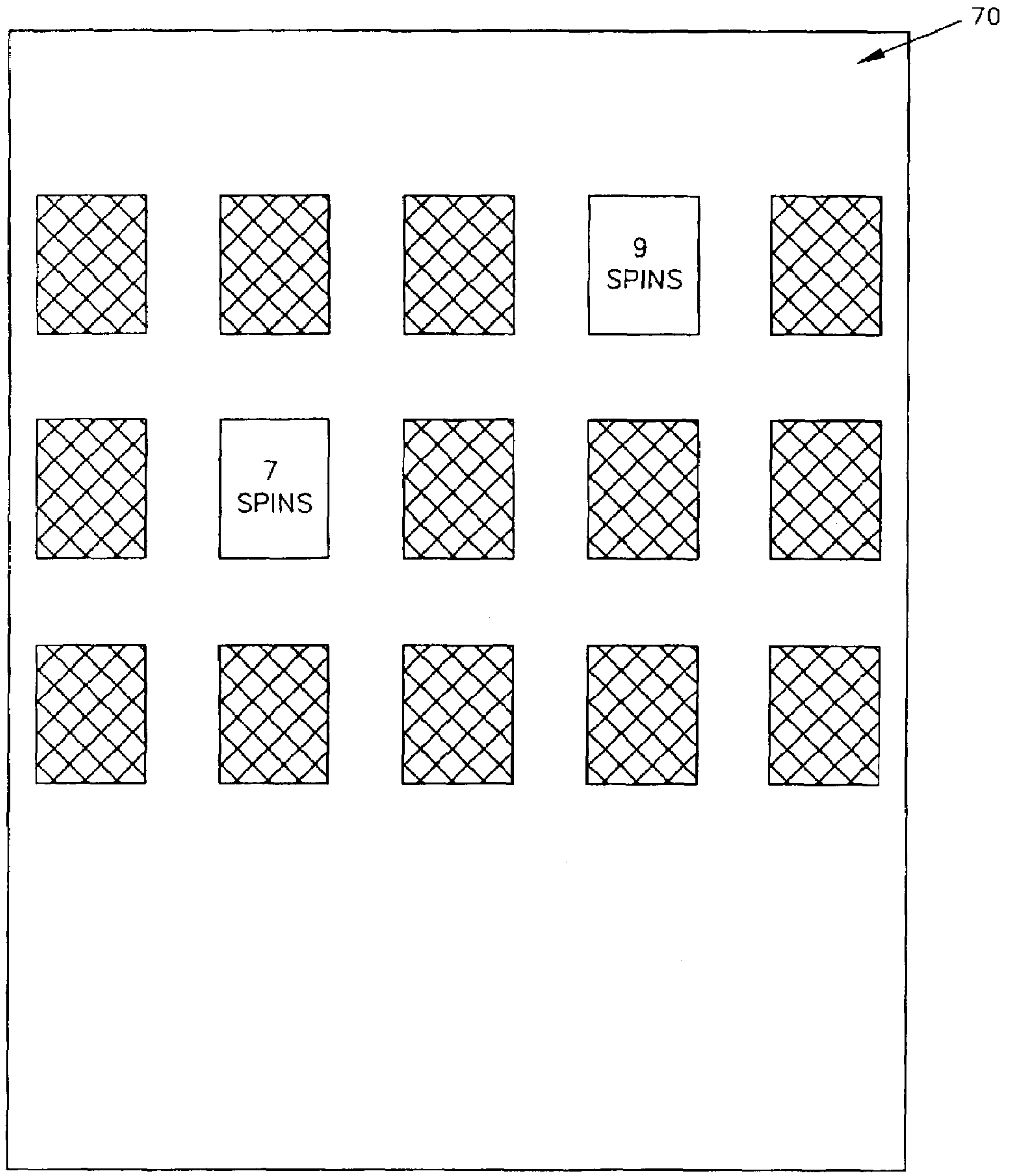
FIG. 7 shows the screen display portion of the gaming machine of the present invention with a representative game outcome showing the result of the bonus round.

The player is allowed to select one or more of the symbols, such as two symbols in the preferred embodiment. The symbols selected by the player change to reveal what the player has won which in this preferred embodiment are free spins of the slot machine game. As shown in FIG. 7, the player has selected two screen locations that have awarded the player nine spins and seven spins for a total of sixteen spins.

These Bonus Round spins are made using the original 5×3 slot machine configuration shown in FIG. 2. These Bonus Round spins can be played using the standard pay table shown in Table 1 or can be played using a different pay table. Additionally, multipliers can be used during the Bonus Round spins, e.g. the player can be awarded a multiplier equal to the number of Bonus Symbols that the player achieved to win the Bonus Round which in this case would be a 4× multiplier since the player achieved four Bonus Symbols as shown in FIG. 5.

The number of symbols, the distribution of symbols in the total pool of symbols, the types of symbols, the number and orientation of the pay tables as well as the number of reels and rows used in the method of play is not critical and is based on the probabilities desired to be employed in the game.

The multiple hand video poker embodiment of the present invention is shown in FIGS. 8–11.

Figure 8:
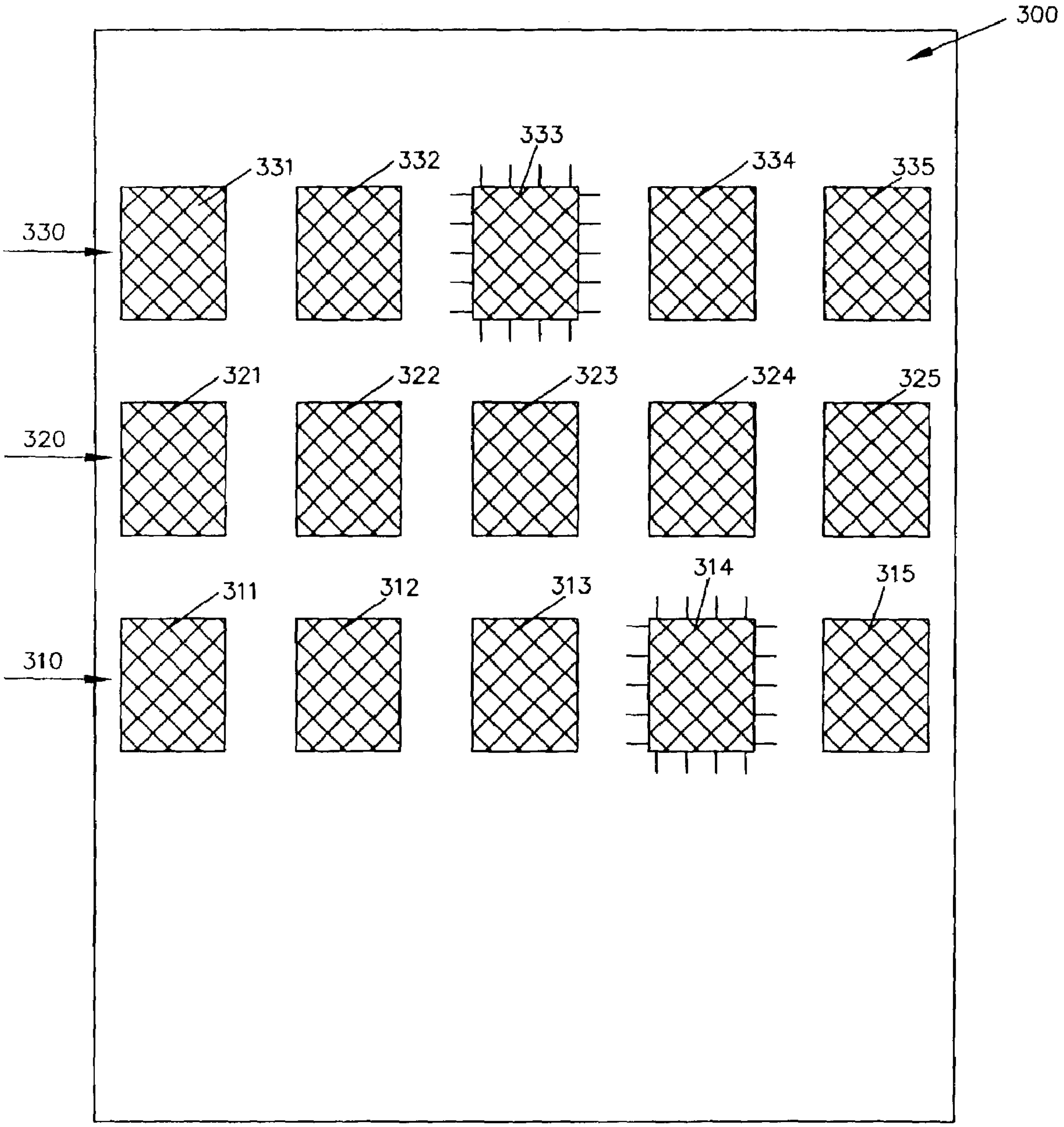
FIG. 8 shows the screen display portion of the multiple hand video poker machine embodiment of the present invention with the three hands displayed face down.

FIG. 8 shows a representative screen display 300 in which the player has selected to play three hands. Preferably, this multiple hand video poker embodiment uses three hands, but any number of multiple hands of two or more can be used in this embodiment.

The initial screen display 300 shows a first hand 310 displayed face down with five card locations 311, 312, 313, 314 and 315. The second hand 320 also is displayed face down with five card locations 321, 322, 323, 324 and 325. The third hand 330 is also displayed face down with five card locations 331, 332, 333, 334 and 335.

The player has wagered on each of the three hands and the player selects two card locations as the player's lucky card locations that are to be switched later in the play of the game. As shown in FIG. 8, the player has selected card location 314 and card location 333 as his lucky card locations.

Figure 9:
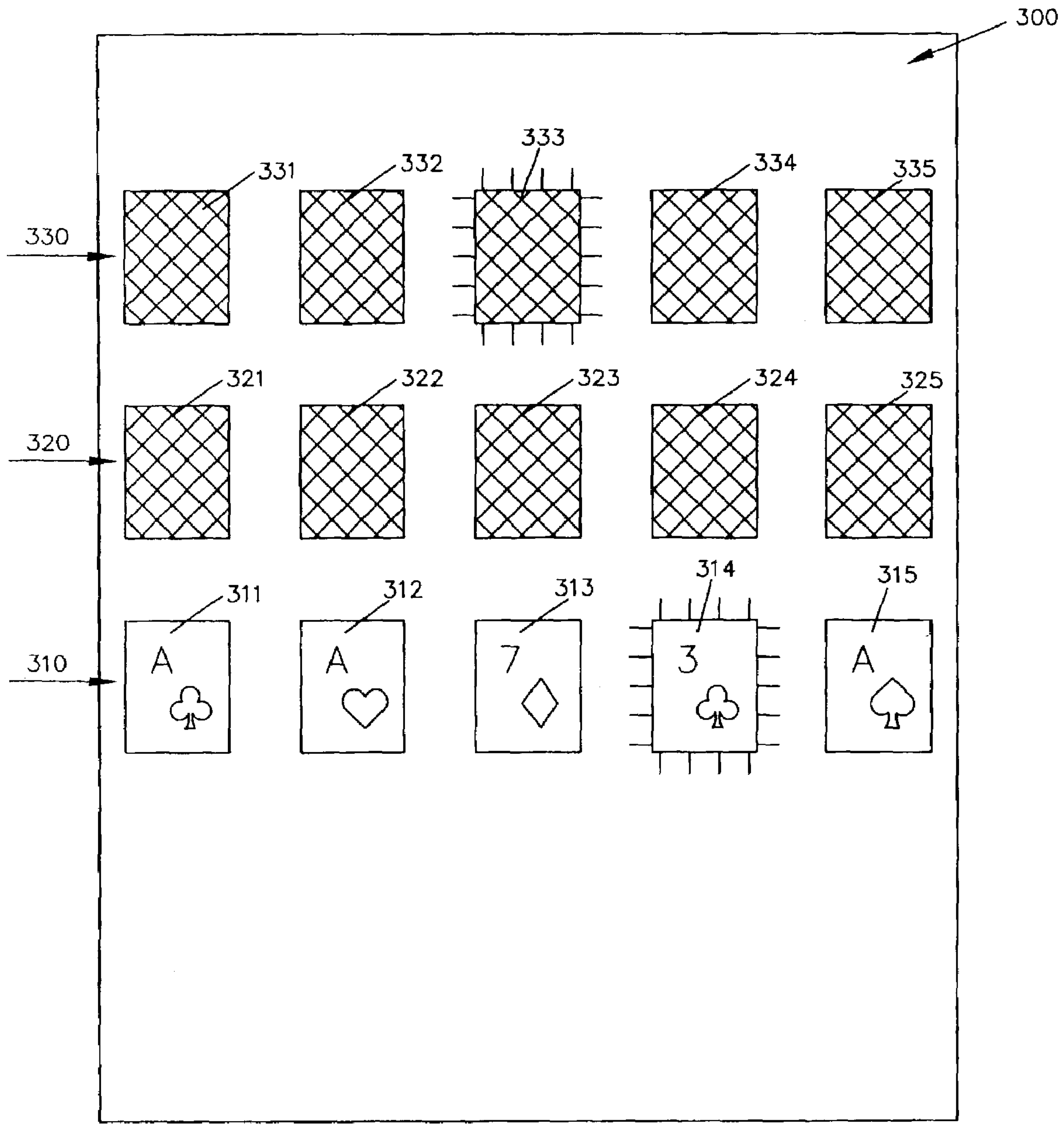
FIG. 9 shows the screen display portion of the multiple hand video poker machine embodiment of the present invention with the first hand displayed face up.

In FIG. 9, the first hand 310 now has the cards revealed face up and the player has received the Ace of Clubs 311, Ace of Hearts 312, Seven of Diamonds 313, Three of Clubs 314 and Ace of Spades 315. The method of play proceeds in the manner described in U.S. Pat. No. 5,873,823. The player selects which cards from the first hand the player wishes to hold.

Figure 10:
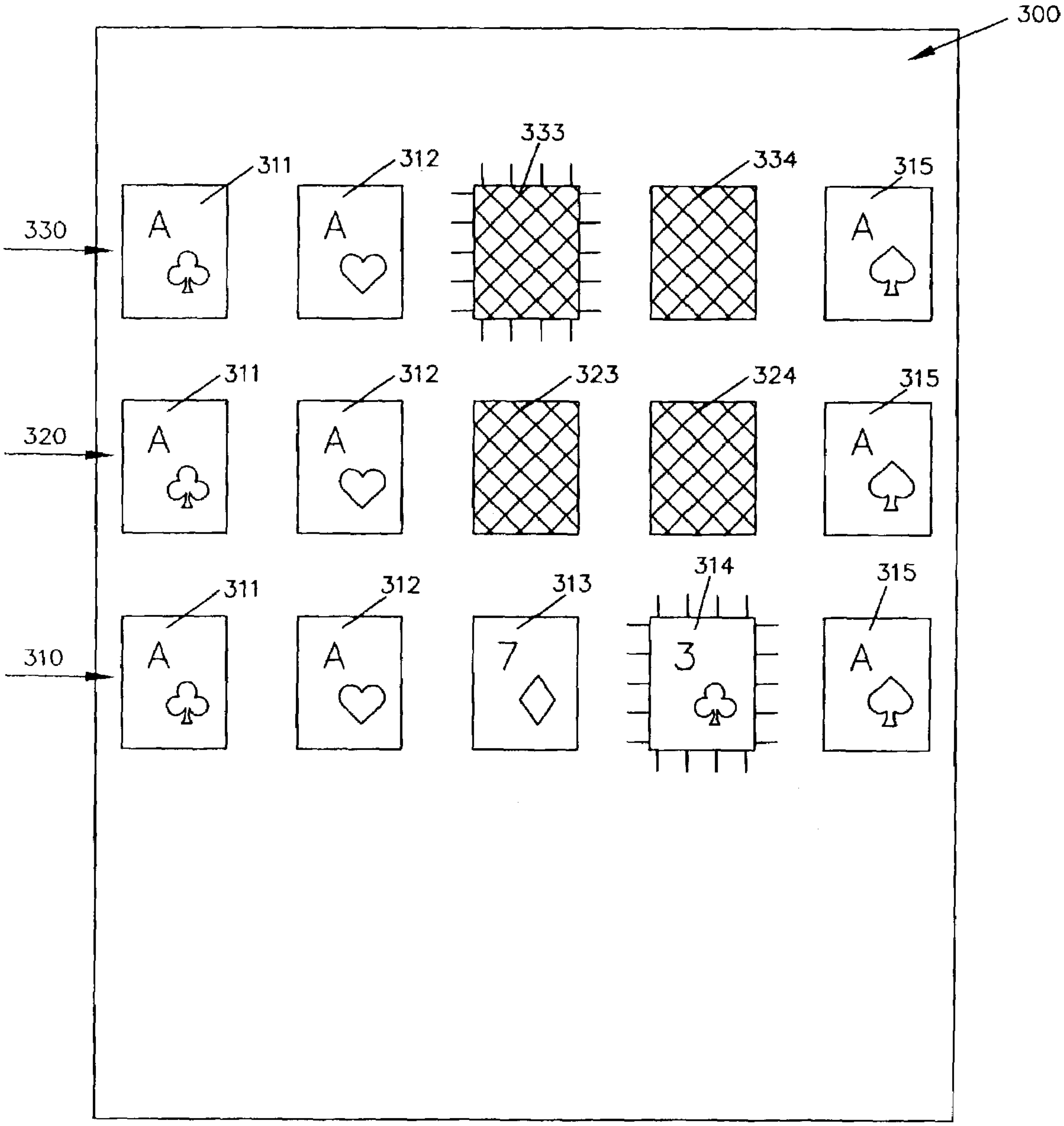
FIG. 10 shows the screen display portion of the multiple hand video poker machine embodiment of the present invention with three hands displayed after the hold step.

As shown in FIG. 10, the player has selected to hold the Ace of Clubs 311, the Ace of Hearts 312 and the Ace of Spades 315. Each of the held cards are also displayed in the second hand 320 and the third hand 330.

Figure 11:
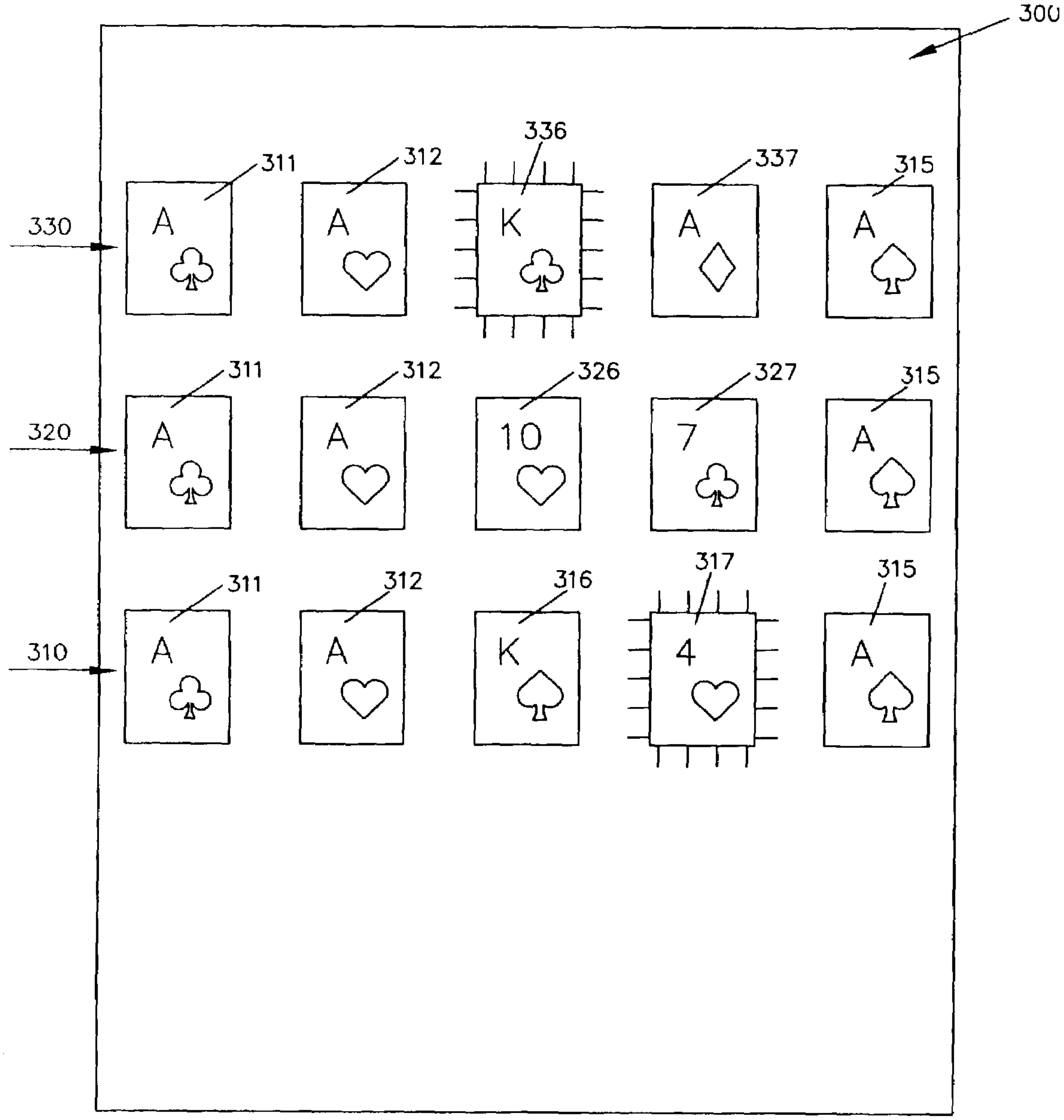
FIG. 11 shows the screen display portion of the multiple hand video poker machine embodiment of the present invention with three hands displayed after the replacement step.

FIG. 11 shows the next step in the method of play. The unselected cards 313 and 314 are discarded and replaced. New cards the King of Hearts 316 and Four of Hearts 317 are displayed in the first hand 310. The Four of Hearts 317 becomes the player's switch card location as this card replaced the card in the player's selected switch card location 314. The first hand 310 now has a poker hand ranking of Three-of-a-Kind.

In the second hand 320, the Ten of Hearts 326 and Seven of Clubs 327 are revealed to complete the five card hand. The second hand 320 now also has a poker hand ranking of Three-of-a-Kind.

In the third hand 330, the King of Clubs 336 and Ace of Diamonds 337 are revealed to complete the five card hand. The King of Clubs 336 becomes the player's switch card location as this card replaced the card in the player's selected switch card location 333. The third hand 330 now has a poker hand ranking of Four-of-a-Kind.

The player receives an award for any winning poker hand combinations that the player has achieved in each of these three hands. Any suitable pay table may be used as is well known to those skilled in the art. The pay table will show the winning poker hand combinations and the amount of the award to be paid to the player which is typically based on the amount of the player's wager. In most pay tables, a Three-of-a-Kind and a Four-of-a-Kind would both be winning poker hand combinations.

Figure 12:
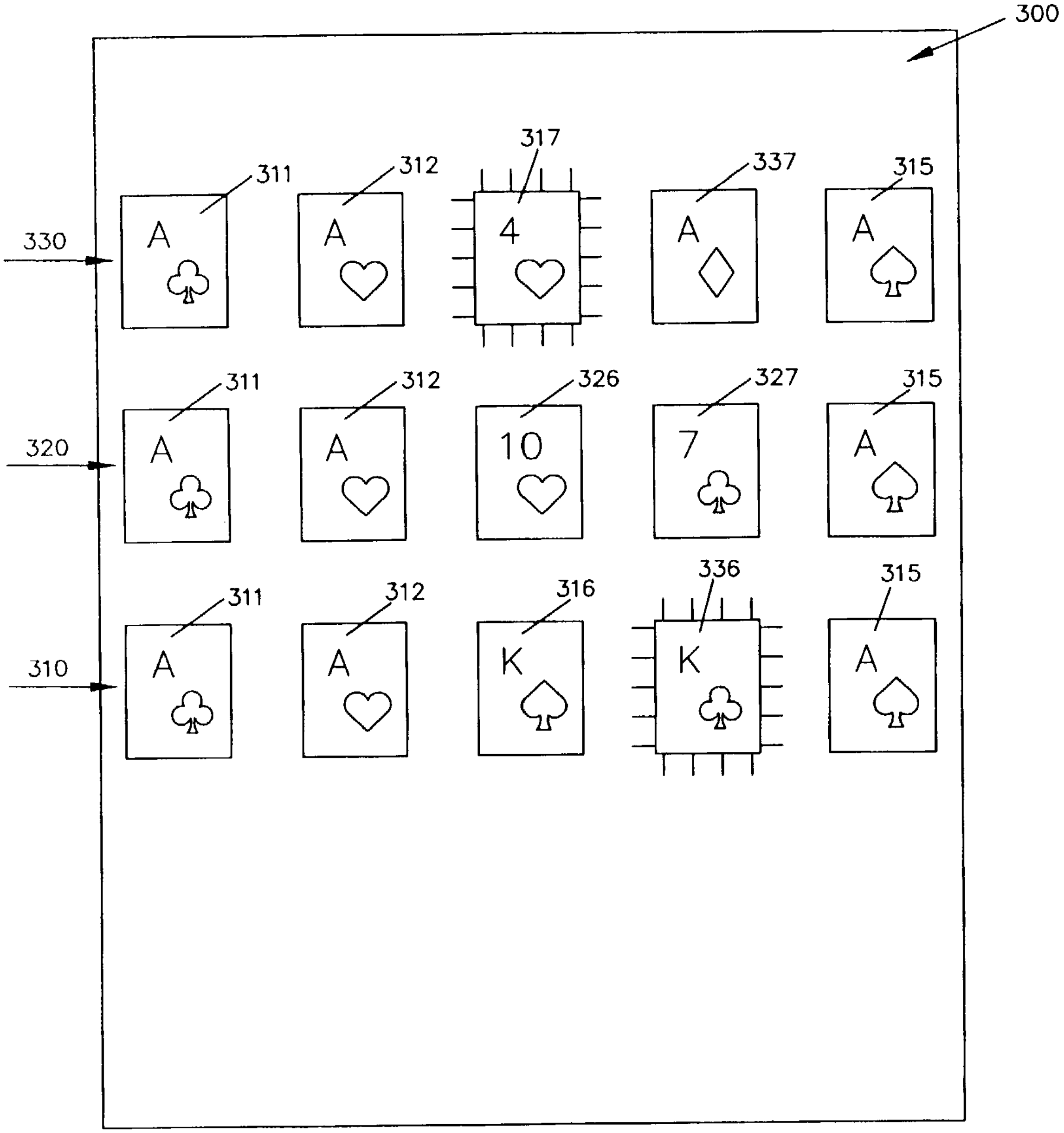
FIG. 12 shows the screen display portion of the multiple hand video poker machine embodiment of the present invention with three hands displayed after the switching step.

The method of play now proceeds to the switch step which is shown in FIG. 12. Card location 317 switches positions with card location 336. Thus the Four of Hearts 317 moves to the third hand 330 and the poker hand ranking of the third hand 330 becomes Four-of-a-Kind. Likewise the King of Clubs 336 moves to the first hand 310 and the poker hand ranking of the first hand 310 becomes a Full House. There is no change to the second hand.

The player receives an award for any winning poker hand combinations now achieved in the hand where the switch occurred. In the example shown in FIG. 12, both the Four-of-a-Kind and the Full House would most likely be winning poker hand combinations in any pay table being used.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A method of playing a slot machine having a matrix of reel stop locations, each reel stop location having a symbol therein, comprising:

a) prior to the slot machine being activated, a player selecting at least two reel stop locations as reel stop locations that will be subsequently switched;
b) causing the slot machine to activate and display randomly a symbol at each of the reel stop locations;
c) paying the player a first predetermined amount if at least one winning combination of symbols appears on the slot machine;
d) switching the reel stop locations selected by the player; and
e) paying the player a second predetermined amount if at least one winning combination of symbols appears on the slot machine.

2. The method of claim 1 including the steps of:

a) providing a plurality of pay lines on the slot machine and allowing the player to make a wager on at least one of the pay lines; and
b) any amounts paid to the player are based on the amount of the wager if the winning combination appears on the pay line upon which the player has wagered.

3. The method of claim 1 including the step of providing a bonus round of play on the slot machine if the player achieves a predetermined arrangement of symbols on the slot machine.

4. The method of claim 3 in which the bonus round includes a separate slot machine game in which the player selects screen locations and is awarded additional spins of the slot machine.

5. A slot machine apparatus having a matrix of reel stop locations, each reel stop location having a symbol therein, comprising:

a) means for a player to select prior to the slot machine being activated at least two reel stop locations as reel stop locations that will be subsequently switched;
b) means causing the slot machine to activate and display randomly a symbol at each of the reel stop locations;
c) means for paying the player a first predetermined amount if at least one winning combination of symbols appears on the slot machine;

d) means for switching the reel stop locations selected by the player; and e) means for paying the player a second predetermined amount if at least one winning combination of symbols appears on the slot machine.

6. The slot machine of claim 5 including:

a) a plurality of pay lines on the slot machine and means for allowing the player to make a wager on at least one of the pay lines; and b) the means for paying the player any amounts are based on the amount of the wager if the winning combination appears on the pay line upon which the player has wagered.

7. The slot machine of claim 5 including means for providing a bonus round of play on the slot machine if the player achieves a predetermined arrangement of symbols on the slot machine.

8. The slot machine of claim 7 in which the means for providing the bonus round includes a separate slot machine game in which the player selects screen locations and is awarded additional spins of the slot machine.

9. A slot machine having a matrix of reel stop locations, each reel stop location having a symbol therein which is configured to perform the following method:

a) prior to the slot machine being activated, a player selecting at least two reel stop locations as reel stop locations that will be subsequently switched;

b) causing the slot machine to activate and display randomly a symbol at each of the reel stop locations;

c) paying the player a first predetermined amount if at least one winning combination of symbols appears on the slot machine;

d) switching the reel stop locations selected by the player; and e) paying the player a second predetermined amount if at least one winning combination of symbols appears on the slot machine.

10. The slot machine of claim 9 in which the method includes the steps of:

a) providing a plurality of pay lines on the slot machine and allowing the player to make a wager on at least one of the pay lines; and b) any amounts paid to the player are based on the amount of the wager if the winning combination appears on the pay line upon which the player has wagered.

11. The slot machine of claim 9 in which the method includes the step of providing a bonus round of play on the slot machine if the player achieves a predetermined arrangement of symbols on the slot machine.

12. The slot machine of claim 11 in which the method includes the bonus round being a separate slot machine game in which the player selects screen locations and is awarded additional spins of the slot machine.

* * * * *